US009062396B2

(12) United States Patent
Putta et al.

(10) Patent No.: US 9,062,396 B2
(45) Date of Patent: Jun. 23, 2015

(54) CORRUGATED KNIT SLEEVE AND METHOD OF CONSTRUCTION THEREOF

(71) Applicant: Federal-Mogul Powertrain, Inc., Southfield, MI (US)

(72) Inventors: Lucia Della Putta, Compiegne (IT); Lionel Dromain, Crepy en Valois (FR); Zhong Huai Zhang, Pottstown, PA (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 187 days.

(21) Appl. No.: 13/836,299

(22) Filed: Mar. 15, 2013

(65) Prior Publication Data
US 2014/0260436 A1   Sep. 18, 2014

(51) Int. Cl.
*D04B 1/22* (2006.01)
*F16L 57/02* (2006.01)
*F16L 57/06* (2006.01)

(52) U.S. Cl.
CPC ................ *D04B 1/225* (2013.01); *F16L 57/02* (2013.01); *F16L 57/06* (2013.01)

(58) Field of Classification Search
CPC .................................. D04B 1/22; D04B 1/225
USPC ................ 66/170, 169 R, 202, 195, 197, 200
See application file for complete search history.

(56) References Cited

U.S. PATENT DOCUMENTS

| | | | |
|---|---|---|---|
| 537,318 A | 4/1895 | Stowe | |
| 1,997,618 A | 4/1935 | Williamson | |
| 2,829,671 A | 4/1958 | Ernst et al. | |
| 2,881,603 A * | 4/1959 | Vendetti | 66/9 R |
| 2,962,050 A | 11/1960 | Ramberg et al. | |
| 3,044,497 A * | 7/1962 | Rebut | 138/121 |
| 3,682,202 A | 8/1972 | Buhrmann et al. | |
| 3,779,308 A | 12/1973 | Buhrmann et al. | |
| 3,805,848 A | 4/1974 | Chrow | |

(Continued)

FOREIGN PATENT DOCUMENTS

| | | |
|---|---|---|
| EP | 1775811 A1 | 4/2007 |
| EP | 2312192 A1 | 4/2011 |
| JP | 3113189 | 5/1991 |

OTHER PUBLICATIONS

International search report mailed May 26, 2014 (PCT/US2014/019717).

*Primary Examiner* — Danny Worrell
(74) *Attorney, Agent, or Firm* — Robert L. Stearns; Dickinson Wright, PLLC

(57) ABSTRACT

A knit tubular sleeve for providing abrasion resistance and expansion restriction to an elastic elongate member extending therethrough and method of construction thereof is provided. The knit tubular sleeve includes a knit tubular wall extending along a longitudinal axis between opposite ends. The knit wall has a plurality of coaxially aligned first regions forming crests spaced axially from one another by intermediate second regions forming troughs between the crests. The first and second regions are knitted over a plurality of courses, with each of the courses comprising a plurality of knit stitches extending circumferentially around the longitudinal axis. The courses of the first regions are formed with a different pattern of knit stitches from the courses of the second regions, wherein the second regions provide the wall with a decreased capacity to expand radially relative to the first regions, thereby inhibiting the elongate member against radial expansion.

17 Claims, 5 Drawing Sheets

(56) References Cited

U.S. PATENT DOCUMENTS

| | | |
|---|---|---|
| 4,259,991 A | 4/1981 | Kutnyak |
| 4,302,266 A | 11/1981 | Kutnyak |
| 4,461,324 A | 7/1984 | Schneider |
| 4,585,035 A | 4/1986 | Piccoli |
| 4,679,599 A | 7/1987 | Newberry et al. |
| 4,759,388 A | 7/1988 | Kiyama et al. |
| 4,836,080 A | 6/1989 | Kite, III et al. |
| 5,509,282 A * | 4/1996 | Ferrell, Jr. .................. 66/188 |
| 5,520,018 A | 5/1996 | Wood |
| 5,744,206 A | 4/1998 | Russek et al. |
| 6,112,771 A | 9/2000 | Aoyagi et al. |
| 6,897,375 B2 | 5/2005 | Lindner |
| 7,614,428 B2 | 11/2009 | Henry et al. |
| 7,757,517 B2 | 7/2010 | Malloy |
| 7,823,420 B2 | 11/2010 | Andrieu et al. |
| 2003/0089971 A1* | 5/2003 | Akers et al. .................. 257/678 |
| 2007/0131302 A1* | 6/2007 | Relats et al. .................. 139/83 |
| 2009/0226653 A1 | 9/2009 | Harris et al. |
| 2010/0230952 A1 | 9/2010 | Ong |

\* cited by examiner

CORRUGATED KNIT SLEEVE AND METHOD OF CONSTRUCTION THEREOF

BACKGROUND OF THE INVENTION

1. Technical Field

This invention relates generally to protective tubular sleeves for providing protection to elongate members contained therein, and more particularly to corrugated knit tubular sleeves and to their method of construction.

2. Related Art

Corrugated rubber hoses are commonly used in various industries to provide a tubular member through which media can be routed, such as elongate members, fluid and gas. The corrugations of the hose provide enhanced radial crush strength, while at the same time providing enhanced flexibility to enable the hose to be routed over meandering paths without kinking. Although corrugated rubber hoses provide certain benefits, they also require being protected against abrasion and from radial expansion, particularly when used to route high pressure fluid or gas. Accordingly, a supplemental sleeve constructed to provide protection against abrasion coupled with a plurality of rigid annular anti-expansion rings to prevent radial expansion, such as, in addition to clamp rings, plastic or metal rings disposed along the length of the sleeve, are commonly used in combination with corrugated rubber hoses. Although the supplemental sleeve and anti-expansion rings provide abrasion and anti-expansion protection to the underlying rubber hose, they come at an added cost, both in manufacture and assembly.

SUMMARY OF THE INVENTION

In accordance with one aspect of the invention, a knit tubular sleeve for providing abrasion resistance and expansion restriction to an elongate member extending therethrough is provided. The knit tubular sleeve includes a knit tubular wall extending along a longitudinal axis between opposite ends. The wall has a plurality of coaxially aligned first regions forming crests spaced axially from one another by intermediate second regions forming troughs between the crests. The first and second regions are knitted over a plurality of courses, with each of the courses comprising a plurality of knit stitches extending circumferentially around the longitudinal axis. The courses of the first regions are formed with a different pattern of knit stitches from the courses of the second regions and thereby provide the second regions with a decreased or restricted capacity to expand radially relative to the first regions, thereby inhibiting the elongate member from expanding radially and protecting the elongate member against rupture due to overexpansion.

In accordance with another aspect of the invention, the tubular wall further includes cylindrical regions knitted over a plurality of courses. Each of the cylindrical regions extends from one of the opposite ends toward an adjacent crest. The courses of the cylindrical regions are formed with a different pattern of knit stitches from the courses of the first and second regions.

In accordance with another aspect of the invention, the first regions are formed by one of 1×1 jersey knit stitches or interlocking knit stitches.

In accordance with another aspect of the invention, the second regions include missed-stitches.

In accordance with another aspect of the invention, the cylindrical regions include missed-stitches.

In accordance with another aspect of the invention, the crests formed by the first regions extend from radially innermost courses adjacent the troughs to radially outermost courses forming peaks, wherein the knit stitches of the peaks have stitch lengths greater than the knit stitches of the radially innermost courses.

In accordance with another aspect of the invention, the knit stitches in alternating courses of each of the first regions increase in length from the radially innermost course to the course forming the peak.

In accordance with another aspect of the invention, a method of constructing a tubular sleeve for preventing over expansion of an elongate corrugated member contained therein is provided. The method includes knitting a tubular wall from a plurality courses extending circumferentially about a longitudinal axis of the wall with the courses forming coaxially aligned first regions having crests and intermediate second regions forming troughs between adjacent crests. Further, knitting the courses of the first regions having a different pattern of knit stitches from the courses of the second regions to provide the second regions with a decreased capacity to expand radially relative to the first regions.

In accordance with another aspect of the invention, the method can further include knitting cylindrical regions from a plurality of courses extending from opposite ends of the tubular wall toward an adjacent crest and knitting the courses of the cylindrical regions with knit stitches having a different pattern from the knit stitches in the courses forming the first and second regions.

In accordance with another aspect of the invention, the method further includes knitting the first regions with one of 1×1 jersey knit stitches or interlocking knit stitches.

In accordance with another aspect of the invention, the method further includes knitting the second regions with missed-stitches.

In accordance with another aspect of the invention, the method further includes knitting the cylindrical regions with missed-stitches.

In accordance with another aspect of the invention, the method can further include forming the crests to extend from radially innermost courses adjacent the troughs to radially outermost courses forming peaks and knitting the stitches forming the peaks with stitch lengths greater than stitch lengths of the knit stitches forming the radially innermost courses.

In accordance with another aspect of the invention, the method can further include knitting alternating courses of each of the first regions having knit stitches increasing in length moving from the radially innermost course to the course forming the peak.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
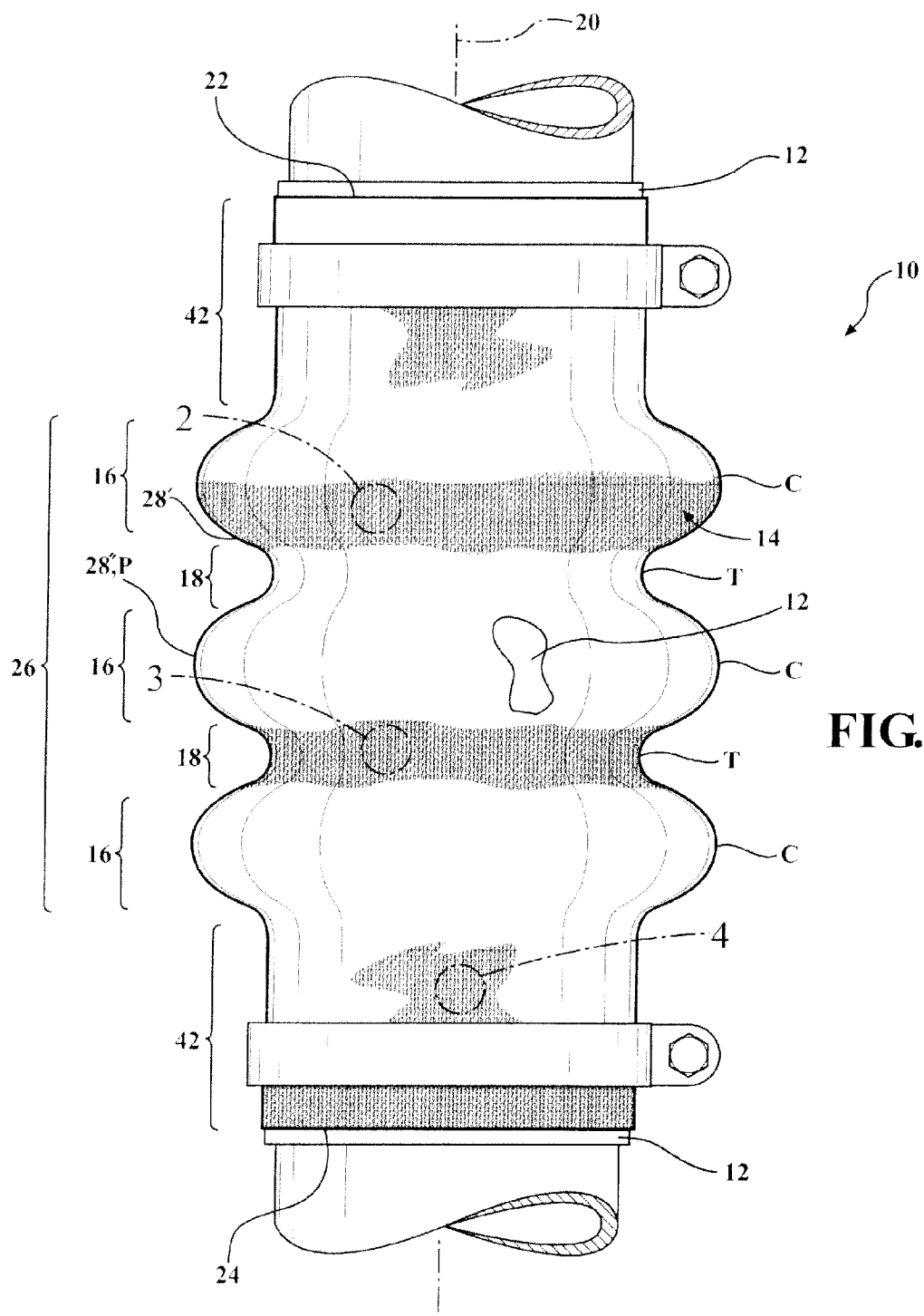
FIG. 1 is side view of a knit tubular sleeve constructed in accordance with one aspect of the invention shown having tubular member extending therethrough.

Referring in more detail to the drawings, FIG. 1 illustrates a knit tubular sleeve 10 for providing abrasion resistance and expansion restriction to an elongate member 12 extending therethrough, shown as a corrugated rubber hose. The inventive construction of a knit tubular wall 14 of the sleeve 10 provides radially expandable first regions 16 that allows the wall 14 to readily conform to the corrugations of the rubber hose 12 while also having radially inflexible second regions 18 that restrict the radial expansion of the rubber hose 12 while high pressure fluid or gas flows therethrough, thereby preventing the hose 12 from rupturing. Further, the sleeve 10 is lightweight, flexible, economical in construction and in assembly, and has a high level of resistance to abrasion.

The wall 14 of the sleeve 12 extends along a longitudinal axis 20 between opposite ends 22, 24. The wall 14 includes a plurality of the first regions 16, which are coaxially aligned with one another and form crests (C) spaced axially from one another by the intermediate second regions 18, which form troughs (T) between the crests. Accordingly, the first and second regions 16, 18 provide the sleeve 12 with a corrugated region 26 configured to conform to the corrugations of the hose 12. The first and second regions 16, 18 are knitted over a plurality of respective circumferentially extending courses 28, 30, wherein each of the courses 28, 30 comprising a plurality of respective knit stitches 32, 33 extending circumferentially around the longitudinal axis 20. The courses 28 of the first regions 16 are formed with knit stitches 32 of a different stitch pattern from the courses 30 of the second regions 18, wherein the stitch pattern of the first regions 16 allow for at least some radial expansion and the stitch pattern of the second regions 18 inhibit radial expansion. Accordingly, the second regions 18 provide a decreased capacity to expand radially relative to the first regions 16.

Figure 2A:
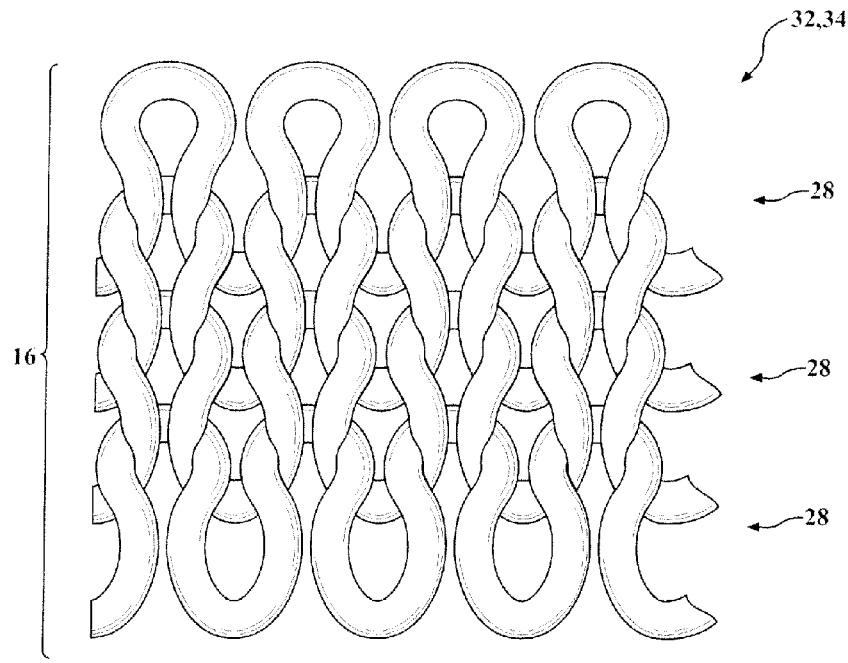
FIG. 2A is an enlarged view of one embodiment of the encircled area 2 of FIG. 1.
Figure 2B:
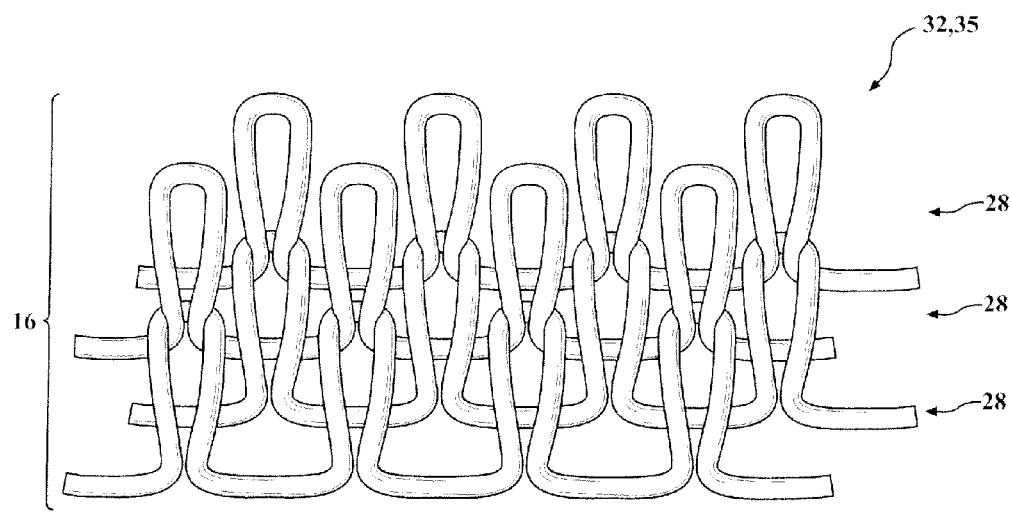
FIG. 2B is an enlarged view of another embodiment of the encircled area 2 of FIG. 1.

The first regions 16 are formed by one of jersey knit stitches in a 1×1 stitch pattern 34 (FIG. 2A) or an interlocking knit stitch pattern 35 (FIG. 2B). These types of patterns have a continuous string of knit loops of yarns interlinked with one another, wherein the interlinked knit loops allow for radial expansion. By allowing radial expansion, the first regions 16 are able to readily conform to the corrugated shape of the hose 12 passing through the sleeve 10. The crests C of the first regions 16 extend from radially innermost courses 28' adjacent the troughs T to radially outermost courses 28" forming peaks P. The knit stitches forming the radially outermost courses 28" of the peaks P have stitch lengths greater than the knit stitches forming the radially innermost courses 28' of the crests C. The knit stitches in alternating courses 28 of each of the first regions 16 increase in length from the radially innermost course 28' to the radially outermost course 28" forming the peak P. Accordingly, reduced length knit stitches are adjacent the troughs T, while increased length knit stitches are adjacent the peaks P, with intermediate length knit stitches being between the troughs T and the peaks P. The reduced length knit stitches provide enhanced radial expansion, while the increased length knit stitches have less capacity for radial expansion, thereby providing the desired balance of radial expansion and restriction within the crests C. The axial length of the first regions 16 can be formed as desired to ensure conformity with the crests of the underlying hose, and in one example, the first regions 16 are constructed having 24 courses, which, as discussed above, include knit stitches that increase in length every 2 courses moving radially outwardly from the trough T to the peak P.

Figure 3A:
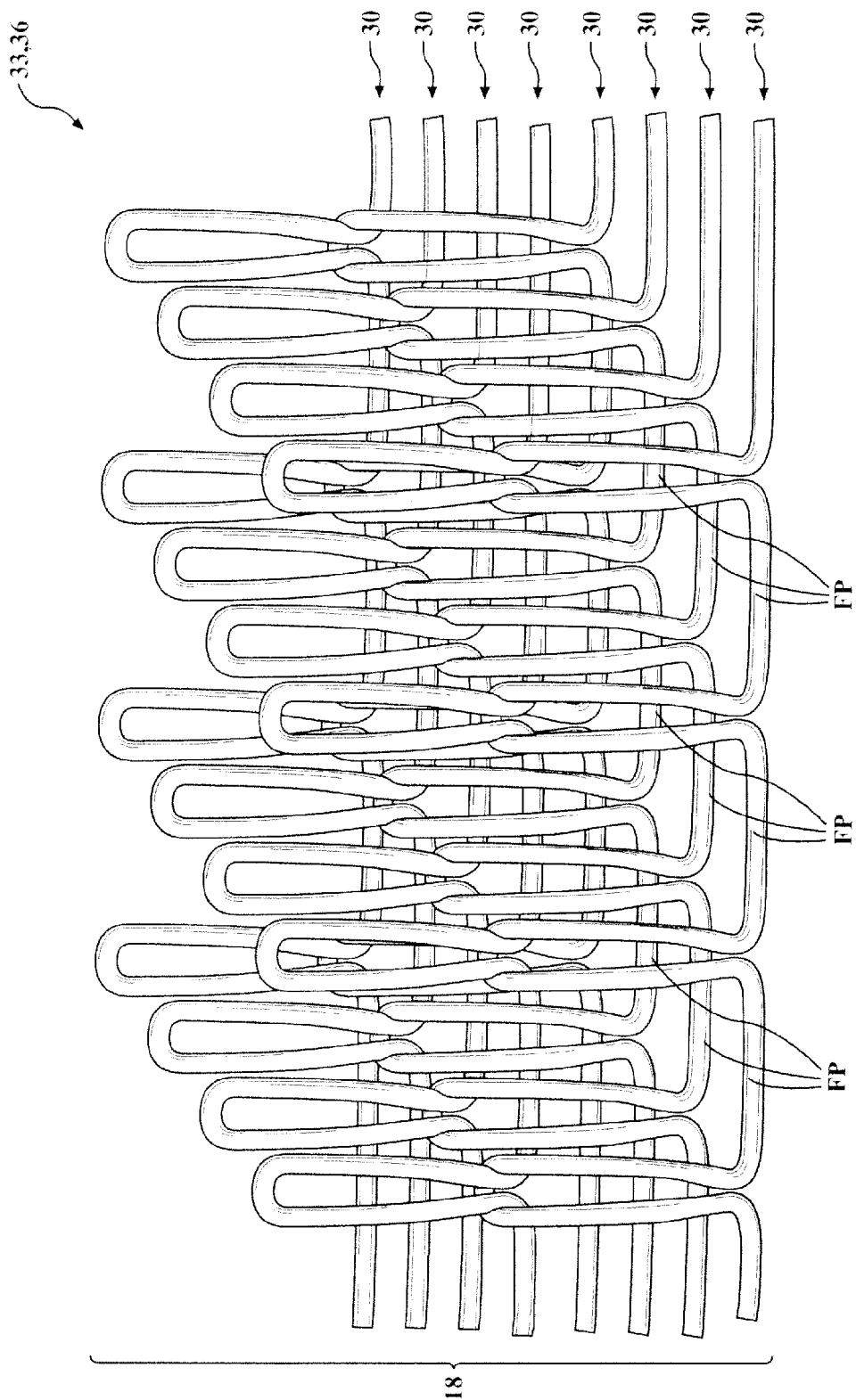
FIG. 3A is an enlarged view of one embodiment of the encircled area 3 of FIG. 1.
Figure 3B:
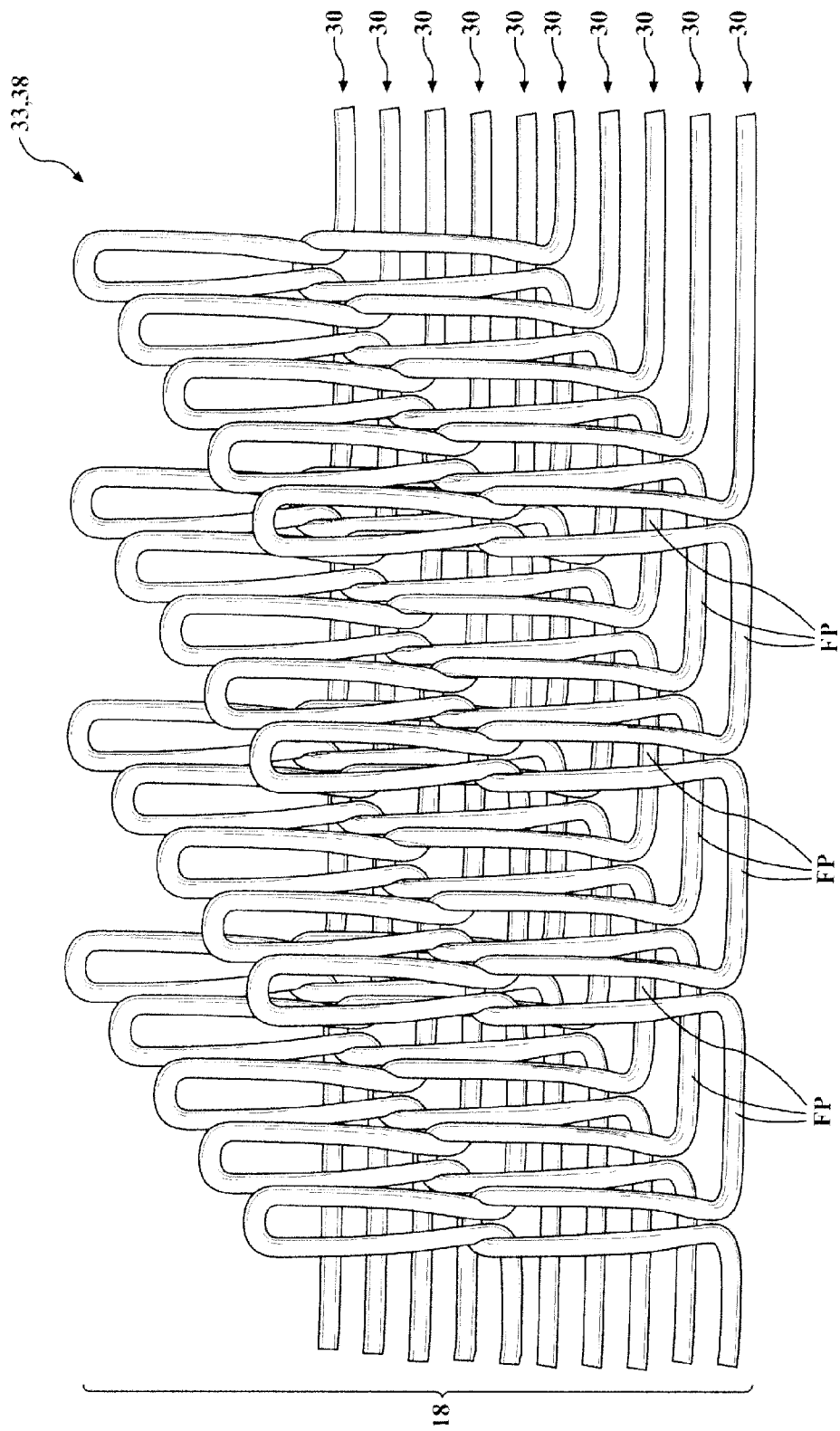
FIG. 3B is an enlarged view of another embodiment of the encircled area 3 of FIG. 1.

In contrast, the second regions 18 are formed by missed-stitches, wherein the missed-stitches are formed by skipping at least 3 needles, also referred to as a 3 needle skip twill pattern 36 (FIG. 3A), or by skipping more needles, such as 4 needles, also referred to as a 4 needle skip twill pattern 38 (FIG. 3B). By skipping needles, straight float portions FP of the yarns are formed. The straight float portions FP inherently have minimal capacity to stretch, given then are already straight or substantially straight, in contrast to the continuous string of loops forming the first regions 16. The axial length of the second regions 18 can be formed as desired to ensure conformity with the troughs of the underlying hose, and in one example, the second regions 18 are constructed having 24 courses, with 20 intermediate courses being knit with a 3 or 4 needle skip twill pattern, as discussed above, and 2 outermost courses on each side of the intermediate courses being knit include knit with interlock stitches.

Figure 4:
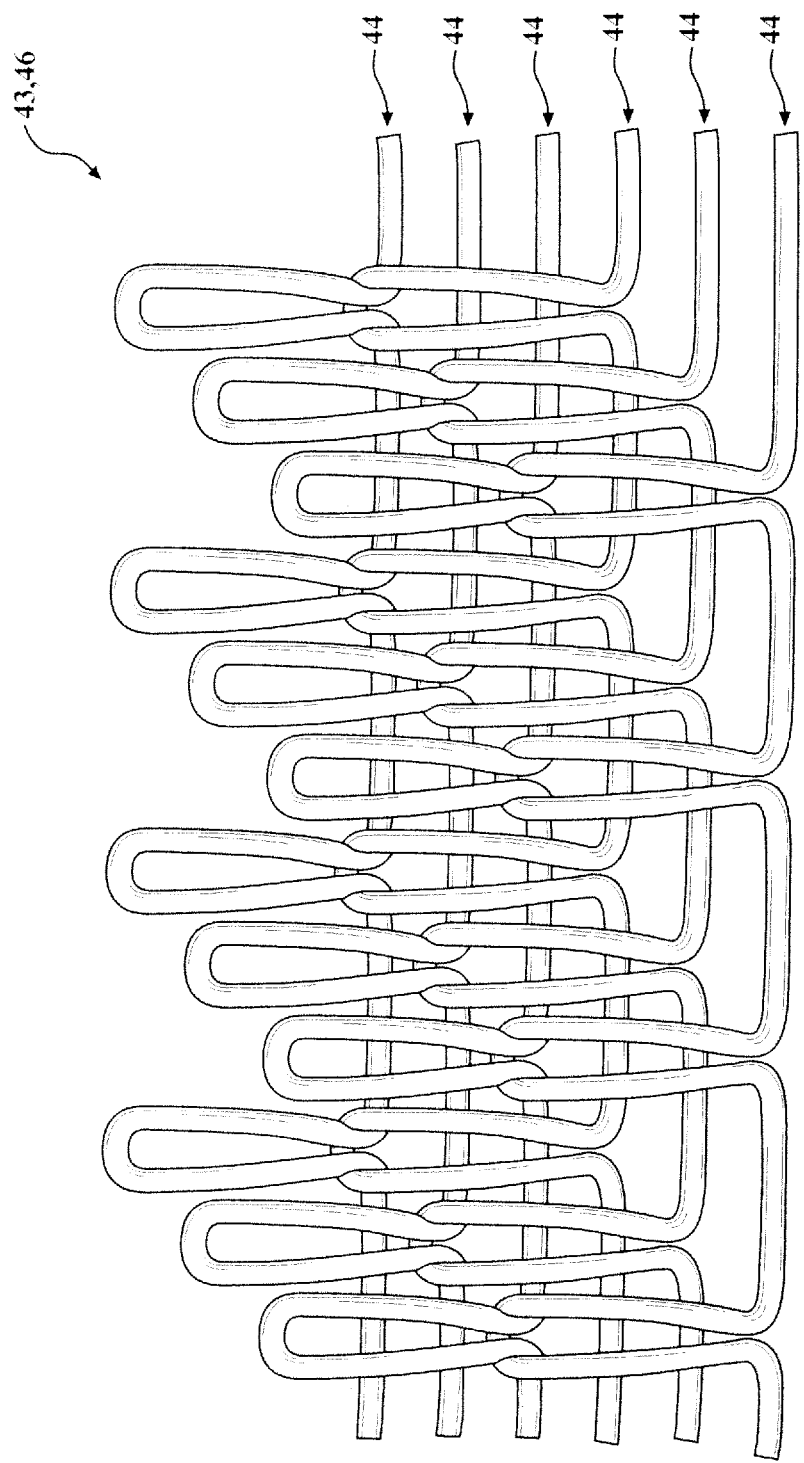
FIG. 4 is an enlarged view of the encircled area 4 of FIG. 1.

In addition to the first and second regions 16, 18, the tubular wall 14 further includes cylindrical regions 42 knitted via knit stitches 43 over a plurality of courses 44. Each of the cylindrical regions 42 extends from one of the opposite ends 22, 24 toward an adjacent crest C of the nearest or adjacent first region 16. The courses 44 of the cylindrical regions 42 are formed with a different pattern of knit stitches 43 from the knit stitches 32, 33 forming the courses 28, 30 of the respective first and second regions 16, 18. Like the second regions 18, the cylindrical regions 42 are formed with missed-stitches, however, the missed-stitches of the cylindrical regions 42 are formed by skipping 2 needles, also referred to as a 2 needle skip twill pattern 46 (FIG. 4). As such, the cylindrical regions 42 have a decreased ability to expand radially relative to the first regions 16, but have an increased ability to expand radially relative to the second regions 18. Although having a decreased ability to expand radially relative to the first regions 16, the abrasion resistance of the cylindrical regions 42 is increased relative to the first regions 16, thereby providing the cylindrical regions 42 with a knit pattern capable of meeting the requirements for clamps to be installed thereon. The axial length of the cylindrical regions 42 can be formed as desired to ensure substantial conformity in length with the cylindrical ends of the underlying hose, and in one example, the cylindrical regions 42 are constructed having 30 courses.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A knit tubular sleeve for providing abrasion resistance and expansion restriction to an elongate member extending therethrough, comprising:

a knit tubular wall extending along a longitudinal axis between opposite ends, said wall having a plurality of coaxially aligned first regions forming crests spaced axially from one another by intermediate second regions forming troughs between said crests, said first and second regions being knitted over a plurality of courses, each of said courses comprising a plurality of knit stitches extending circumferentially around said longitudinal axis, said courses of said first regions being formed with knit stitches of a different stitch pattern from said courses of said second regions and thereby providing said second regions with a decreased capacity to expand radially relative to said first regions, wherein said second regions include missed-stitches; and wherein said crests formed by said first regions extend from radially innermost courses adjacent said troughs to radially outermost courses forming peaks, said knit stitches of said peaks having stitch lengths greater than said knit stitches of said radially innermost courses.

2. The knit tubular sleeve of claim 1 wherein said wall further includes cylindrical regions knitted over a plurality of courses, each of said cylindrical regions extending from one of said opposite ends toward an adjacent crest, said courses of said cylindrical regions being formed with a different pattern of knit stitches from said courses of said first and second regions.

3. The knit tubular sleeve of claim 1 wherein said first regions are formed by one of 1×1 jersey knit stitches or interlocking knit stitches.

4. The knit tubular sleeve of claim 1 wherein said second region missed-stitches skip at least 3 needles.

5. The knit tubular sleeve of claim 4 wherein said second region missed-stitches skip 4 needles.

6. The knit tubular sleeve of claim 2 wherein said cylindrical regions include missed-stitches.

7. The knit tubular sleeve of claim 6 wherein said cylindrical region missed-stitches skip 2 needles.

8. The knit tubular sleeve of claim 1 wherein said knit stitches in alternating courses of each of said first regions increase in length from said radially innermost course to said course forming said peak.

9. A method of constructing a tubular sleeve, comprising:
knitting a tubular wall from a plurality courses extending circumferentially about a longitudinal axis of the wall with the courses forming coaxially aligned first regions having crests and intermediate second regions forming troughs between adjacent crests;

knitting the courses of the first regions having a different pattern of knit stitches from the courses of the second regions to provide the second regions with a decreased capacity to expand radially relative to the first regions;

further including forming the crests to extend from radially innermost courses adjacent the troughs to radially outermost courses forming peaks and knitting the stitches forming the peaks with stitch lengths greater than stitch lengths of the knit stitches forming the radially innermost courses; and further including knitting cylindrical regions from a plurality of courses extending from opposite ends of the tubular wall toward an adjacent crest and knitting the courses of the cylindrical regions with knit stitches having a different pattern from the knit stitches in the courses forming the first and second regions.

10. The method of claim 9 further including knitting the first regions with one of 1×1 jersey knit stitches or interlocking knit stitches.

11. The method of claim 9 further including knitting the second regions with missed-stitches.

12. The method of claim 10 further including knitting the second regions with missed-stitches.

13. The method of claim 12 further including skipping at least 3 needles to form the second region missed-stitches.

14. The method of claim 13 further including skipping 4 needles to form the second region missed-stitches.

15. The method of claim 9 further including knitting the cylindrical regions with missed-stitches.

16. The method of claim 15 further including skipping 2 needles to form the cylindrical region missed-stitches.

17. The method of claim 9 further including knitting alternating courses of each of the first regions having knit stitches increasing in length moving from the radially innermost course to the course forming the peak.

* * * * *